United States Patent [19]
Konno et al.

[11] Patent Number: 5,155,609
[45] Date of Patent: Oct. 13, 1992

[54] SPATIAL LIGHT MODULATOR OF POLYMER-DISPERSED LIQUID CRYSTAL

[75] Inventors: Toshio Konno, Yokohama; Tadayuki Shimada, Yokosuka; Atsushi Nakano, Yokohama; Masanobu Shigeta, Yokosuka; Nozomu Okochi, Yokosuka; Shigeo Shimizu, Yokohama, all of Japan

[73] Assignee: Victor Company of Japan, Yokohama, Japan

[21] Appl. No.: 538,381

[22] Filed: Jun. 14, 1990

[30] Foreign Application Priority Data

Jun. 15, 1989 [JP] Japan ................................. 1-152853
Jan. 23, 1990 [JP] Japan ................................. 2-14622

[51] Int. Cl.$^5$ ................................. G02F 1/13
[52] U.S. Cl. ................................. 359/71; 359/52; 359/72
[58] Field of Search ............ 350/342, 339 R, 334, 350/338, 350 R, 347 R, 356, 360; 359/51, 52, 62, 71, 72

[56] References Cited

U.S. PATENT DOCUMENTS

| | | | |
|---|---|---|---|
| 3,824,002 | 7/1974 | Beard | 350/342 |
| 4,093,357 | 6/1978 | Jacobson et al. | 350/342 |
| 4,672,014 | 6/1987 | Joiner et al. | 350/342 |
| 4,728,174 | 3/1988 | Grinberg et al. | 350/339 R |
| 4,787,713 | 11/1988 | Lu et al. | 350/342 |
| 4,826,300 | 5/1989 | Efron et al. | 359/72 |
| 4,842,376 | 6/1989 | Braatz et al. | 359/72 |
| 4,908,584 | 3/1990 | Reichman | 350/342 |
| 4,925,276 | 5/1990 | McMurray et al. | 350/342 |
| 4,944,576 | 7/1990 | Lacker et al. | 350/347 V |
| 4,994,204 | 2/1991 | Doane et al. | 350/347 E |
| 5,004,323 | 4/1991 | West | 350/350 R |

FOREIGN PATENT DOCUMENTS

| | | | |
|---|---|---|---|
| 57-188024 | 11/1982 | Japan | 350/342 |
| 58-215626 | 12/1983 | Japan | 350/342 |
| 63-253924 | 10/1988 | Japan | 350/342 |

OTHER PUBLICATIONS

Efron et al., "A silicon Photoconductor Based Liquid crystal Light Valve", SID 81 Digest, p. 142.
Applied Physics Letter, vol. 22, No. 3, Feb. 1973, "ac liquid-crystal light valve".

Primary Examiner—Rolf Hille
Assistant Examiner—Minhloan Tran
Attorney, Agent, or Firm—Michael N. Meller

[57] ABSTRACT

A spatial light modulator having first and second electrodes, and a photoconductive layer member, a photo-modulation layer member and a reflecting member interposed between the first and second electrodes. The photo-modulation layer member is composed of a composite layer of polymer and liquid crystal material dispersed in the polymer. The reflecting member includes a light-absorbing layer.

4 Claims, 6 Drawing Sheets

SPATIAL LIGHT MODULATOR OF POLYMER-DISPERSED LIQUID CRYSTAL

BACKGROUND OF THE INVENTION

The present invention relates to a spatial light modulator applicable to, for example, an image pickup device and an optical projector, or employed on, for example, an optical computer and a video projector.

For receiving an optical image and emitting the optical image for an optical projector and for optical parallel signal processing in an optical computer and image-recording, a spatial light modulator element, such as a liquid crystal-type optical modulator, a photoconductive Pockels-effect device and a microchannel spatial light modulator or a device made of a photochromic material has been developed.

Figure 1:
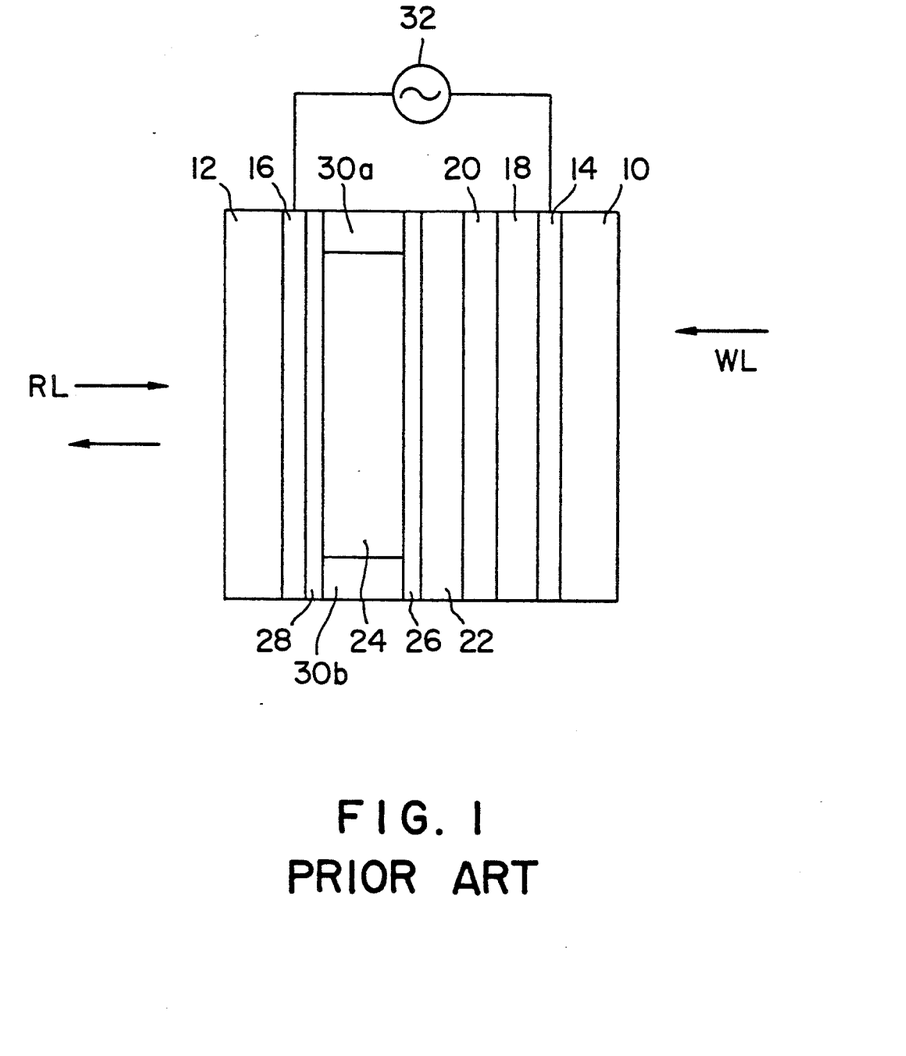
FIG. 1 is a side cross-sectional view of a conventional spatial light modulator.

One known spatial light modulator is shown in FIG. 1. The spatial light modulator is composed of glass plates 10 and 12, transparent electrodes 14 and 16, a photoconductive layer 18, a light blocking layer 20, a dielectric mirror 22, and a photo-modulation layer 24 composed of twisted-nematic liquid crystals in which the intensity of the light incident thereto varies accordingly with the field distribution applied thereto. The photo-modulation layer 24 is formed by filling the twisted-nematic liquid crystals into a cell formed by spacers 30a and 30b and sandwiched between aligning layers 26 and 28.

In FIG. 1, when a light WL carrying an optical image is incident to the spatial light modulator through the glass plate 10 under the state that an a.c. voltage is applied across the transparent electrodes 14 and 16 by an a.c. power supply 32 and reaches the photoconductive layer 18, the electric resistance thereof varies accordingly with the optical image carried by the light WL.

A charge image corresponding to the optical image is thus generated in the vicinity of the border of the photoconductive layer 18 and the light blocking layer 20. At this time, a field distribution corresponding to the charge image is applied to the photo-modulation layer 24.

Then, when a linearly polarized reading light RL is incident to the spatial light modulator through the glass plate 12, the light RL propagates through the transparent electrode 16, the aligning layer 28, the photo-modulation layer 24, the aligning layer 26, the dielectric mirror 22 and the light blocking layer 20 in succession.

Most of the light RL returns to the glass plate 12 as reflected light from the dielectric mirror 22. In this case, the optical axes of molecules of the liquid crystals in the photo-modulation layer 24 become not parallel to the transparent electrodes 14 and 16. A condition of double refraction of the light RL varies accordingly with the field intensity applied to the photo-modulation layer 24 due to the electro-optic effect of the liquid crystals. A reflected light is thus generated, whose plane of polarization varies according to the generated charge image. As a result, an optical image information corresponding to the optical image carried by the light WL is generated at the glass plate 12.

The light component of the light RL which is not reflected at the dielectric mirror 22 is blocked by the light blocking layer 20 from reaching the photoconductive layer 18. The electric resistance thereof thus does not vary, so that the charge image generated in the vicinity of the border of the photoconductive layer 18 and the light blocking layer 20 also does not vary.

Therefore, a circularly polarized light emitted from the glass plate 12 is passed through an analyzer (not shown) to have a spatial intensity distribution corresponding to the optical image carried by the light WL.

However, there are problems in this conventional image convertor. Namely, it requires a complex process to from the photo-modulation layer 24, that is, the twisted-nematic liquid crystal must be filled into the cell composed by the spacers 30a and 30b.

Furthermore, it is difficult to compose a photo-modulation layer 24 by means of twisted-nematic liquid crystal with uniform thickness in order to produce large spatial light modulators.

It is even more difficult to read and write an image with high resolution by this conventional spatial light modulator.

Next, a photo-modulation element (spatial light modulator) is capable of incoherent to coherent optical conversion or vice versa. Thus, the element is applicable to, for example, data parallel processing and image real-time processing and also to a display system of a video projector by way of optical intensity amplification.

Japanese Patent Laid-Open Application No. 58(1982)-215626 and Appl. Phys. Lett., Vol. 22, No. 3, Feb. 1, 1973 disclose such an element as shown in FIG. 2.

Figure 2:
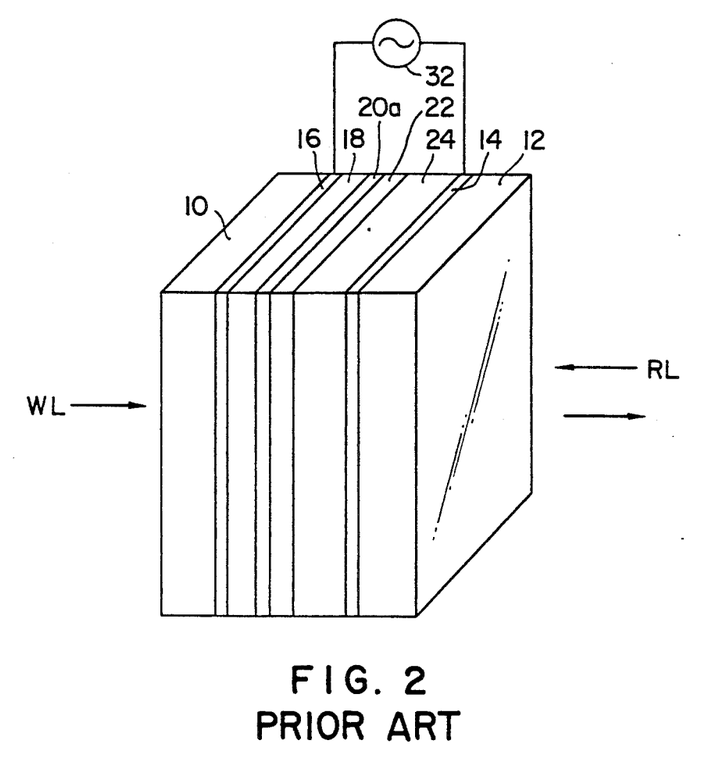
FIG. 2 is a perspective side cross-sectional view of another conventional spatial light modulator.

The element shown in FIG. 2 is composed of glass plates 10 and 12, transparent electrodes 14 and 16, a photo-modulation layer 24 in which liquid crystals are used as the modulation material, a photoconductive layer 18, a dielectric mirror 22 and a nonconductive light blocking membrane 20a.

When a light WL carrying information is incident to the element through the glass plate 10, the light WL reaches the photoconductive layer 18. Pairs of electrons and holes are generated in the photoconductive layer 18 correspondingly with the intensity of the light WL when an a.c. voltage is applied across the transparent electrodes 14 and 16. The pairs are separated from each other to generate a charge image corresponding to the intensity distribution of the light WL.

Next, a light RL for reading the information is incident to the element through the glass plate 12. When the light RL reaches the photo-modulation layer 24, the light RL is photo-modulated therein correspondingly with the intensity of the light WL, due to the electric field of the charge image generated in the photoconductive layer 18. The light RL thus modulated is reflected at the dielectric mirror 22 and emitted out from the glass plate 12.

One of the glass plates 10 and 12 or both of them may be eliminated if crystallized liquid crystal or liquid crystal incorporated in a film is employed as the photo-modulation layer 24. The light blocking layer 20a prevents a part of the reading light passed through the dielectric mirror 22 from reaching the photoconductive layer 18, which would disturb the charge image generated therein and degrade the contrast ratio of the image to be read out.

As is described, a reflecting mirror for reflecting a light RL cannot be eliminated in the photo-modulation element to read an image by way of reflection. A conductive material such as a metal layer cannot be employed as the reflection mirror in principle, so that the dielectric mirror 22 is employed.

Figure 3:
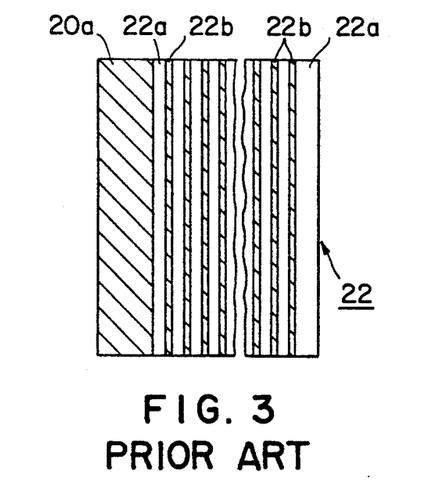
FIG. 3 is a side cross-sectional view of a conventional dielectric mirror.

FIG. 3 shows the dielectric mirror 22 which is composed by alternately laminating layers with low refractive index and layers with high refractive index, each having a thickness of λ/4 with respect to the wavelength λ of the light RL. In FIG. 3, layers 22a made of SiO₂ with low refractive index and layers 22b made of TiO₂ are alternately laminated to each other, with one layer 22a with thickness of λ/2 at an outermost portion of the dielectric mirror 22.

The dielectric mirror 22 thus formed improves its reflectivity or degrades its transmittance of the light RL as the number of laminated layers increases. However, the reflectivity is degraded with an increase of the transmittance if the wavelength in the spectral characteristics of the dielectric mirror 22 falls out of the desired range.

Therefore, the light blocking layer 20a must be laminated to the dielectric mirror 22 shown in FIG. 3 if the light RL is not a monochromatic light and even if the light RL is low in intensity. Improvement in the reflectivity with increase in number of the layers to be laminated results in the thickness of the dielectric mirror 22 bring several microns or more and causes low productivity. A light blocking layer with a thickness of 1 to 10 microns must be employed on, for example, a video projector to emit an intense light RL.

As is described, a conventional photo-modulation element, particularly for a video projector, requires a thick dielectric mirror 22 with a thick light blocking layer 20a. This results in considerable loss of the electric field applied to the photo-modulation layer 24 from the charge image generated in the photoconductive layer 18, causing a lower contrast ratio of the image to be read out. Furthermore, the electric field leaking out in a transverse direction lowers the resolution of the image to be read out. Therefore, an upgraded power supply 32 must be employed.

SUMMARY OF THE INVENTION

An object of the present invention is to provide a spatial light modulator which comprises a first electrode through which a first electro-magnetic radiation beam carrying information to be written into the spatial light modulator, passes, a second electrode through which a second electro-magnetic radiation beam for reading the information written in the spatial light modulator, passes, a photoconductive layer member whose impedance varies in response to an intensity of the first electro-magnetic radiation beam incident thereto, a photo-modulation layer member, comprising a composite layer of polymer and liquid crystal material dispersed in the polymer, for modulating the second electro-magnetic radiation beam passing therethrough owing to an electro-optic effect of the photo-modulation layer member for reading the information written in the spatial light modulator, reflecting means laminated to the photo-modulation layer member for reflecting the second electro-magnetic radiation beam incident to and passing through the photo-modulation layer member, photoconductive layer member, photo-modulation layer member, and reflecting means are interposed between the first and second electrodes. The reflecting means is a laminated structure comprising a plurality of layers of two characteristic groups, the refractive index being different for each of each the two groups, and at least one of the two groups being light-absorbing layers.

DESCRIPTION OF THE PREFERRED EMBODIMENTS

The present invention will now be described in detail with reference to the accompanying drawings.

Throughout the drawings, like reference numerals are used to designate like or equivalent elements for the sake of simplicity of explanation.

Figure 4:
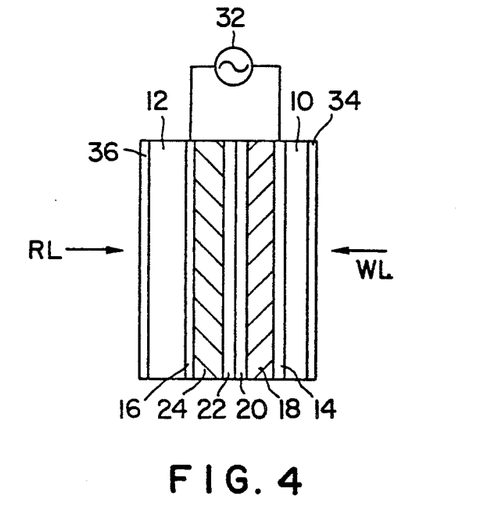
FIG. 4 is a side cross-sectional view of a preferred embodiment of a spatial light modulator according to the present invention.

FIG. 4 shows the first preferred embodiment of a spatial light modulator according to the present invention. The spatial light modulator shown in FIG. 4 is composed of glass plates 10 and 12, transparent electrodes 14 and 16, a photoconductive layer 18, a light blocking layer 20, a dielectric mirror 22, a photo-modulation layer 24 composed of a composite layer of polymer and liquid crystal for changing the scattering of light incident thereto by an electric field applied thereto, and reflection suppressing layer 34 and 36.

The composite layer is formed by dispersing the nematic liquid crystal which exhibits nematic liquid crystal phase at room temperature and have high volume resistivity in a polymer such as polyester resin, polycarbonate resin, vinyl chloride resin, polyamide resin, polyethylene resin, polypropylene resin, polystyrene resin and silicone resin, each having a volume resistivity of $10^{14}$ Ω-cm or more.

Examples of the formation of the composite layer structures are as follows:

(1) Three grams of nematic liquid crystal material E-44 manufactured by BDH Co., the UK, is added to a 10% chloroform solution of 20 grams PMMA (Polymethylmethacrylate). The solution is then stirred and left to settle.

On the other hand, a glass plate 12 is prepared whose one surface is coated with the reflection suppressing layer 36 and another surface thereof is coated with an ITO (Indium-Tin Oxide) layer as the transparent electrode 16 and sufficiently cleansed. The chloroform solution thus settled is applied onto the transparent electrode 16 by a bar-coater to for the photo-modulation layer 24.

As for the polymer, other than PMMA, any polymers which can be dissolved into a solution and formed into a layer and also have high volume resistivity may be used. Polycarbonate and PEI (Polyether Imid) having better transparency are particularly applicable for this purpose. This is also true for the examples (2) and (3) described hereinafter.

The two structures, i.e. the one formed by laminating with each other the reflection suppressing layer 36, the glass plate 12, the transparent electrode 16 and the photo-modulation layer 24, and the other formed by laminating with each other the reflection suppressing layer 34, the glass plate 10, the transparent electrode 14, the photoconductive layer 18, the light blocking layer 20 and the dielectric mirror 22, are stacked with each other to form the spatial light modulator according to the present invention.

(2) Three grams of nematic liquid crystal material LIXON 5017 (or LIXON 5028), manufactured by Chisso Co., Japan, is added to 10 weight % chloroform solution of 20 grams PMMA. The solution is then stirred and left to settle for producing the photomodulation layer 24. Other procedures are the same as described in example (1).

(3) Three grams of nematic liquid crystal material ZLI 4277 manufactured by Merck Japan Ltd., is added to 10 weight % chloroform solution of 20 grams PMMA. The solution is then stirred and left to settle for producing the photomodulation layer 24. Other procedures are the same as described in example (1).

In any of the formation examples (1) to (3) of the composite structures, it is easy to produce and control the photomodulation layer 24 of 8 micron thickness with a ±0.1 micron production error. This facilitates the production of the spatial light modulator according to the present invention compared to the conventional one.

The nematic liquid crystal used in example (2) and (3) has a resistivity of $1 \times 10^{13}$ Ω-cm. Therefore, image information with high resolution can be read/written by means of the spatial light modulator including the photomodulation layer 24 composed of the composite layer of the polymer with the volume resistivity of $1 \times 10^{14}$ Ω-cm or more and the liquid crystal material.

Liquid crystal material having low volume resistivity generally contains undesirable ions of impurities. When this kind of liquid crystal material is used and an electric field of the charge image is applied to this liquid crystal material, these ions move to weaken the electric field. This degrades the resolution of the charge image because the electric field generated by the charge image is distributed by the ions.

However, the spatial light modulator according to the present invention, including the photo-modulation layer 24 composed of the composite layer of a polymer with the volume resistivity of $10^{14}$ Ω-cm and nematic liquid crystals with a resistivity of $1 \times 10^{13}$ Ω-cm containing few ions, does not produce the undesirable phenomenon such as described before. Therefore, the reading/writing operation of the image information with high resolution can be performed by means of the spatial light modulator according to the present invention.

Next, an improved reflecting mirror according to the present invention will be explained with reference to FIGS. 5 and 6. Three samples Nos. 1 to 3 were produced as preferred embodiments and two samples Nos. 4 and 5 were also produced as conventional types for comparison as shown in Table 1.

Figure 5:
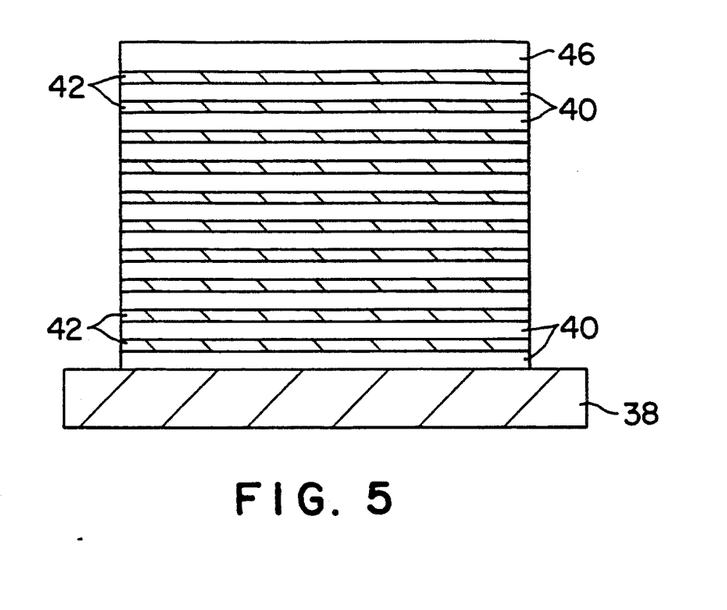
FIG. 5 is a side cross-sectional view of an improved reflecting mirror according to the present invention.

The sample No. 1 is configured as shown in FIG. 5. First, five layers of SiO$_2$ layers 40 and five of Si 42, each layer having an optical thickness of λ/4, are alternately laminated with each other to form a ten-layer lamination on a glass substrate 38 by vacuum evaporation. A SiO$_2$ layer 46 is further laminated on the top of the lamination with optical thickness of λ/2. The conditions for forming each of the SiO$_2$ layers 40 and 46 are a 10 Å/sec evaporation rate and $2 \times 10^{-5}$ Torr degree of vacuum, and for the Si layers 42, 3 Å/sec and 2 to $3 \times 10^{-6}$ Torr, when the substrate 30 is at room temperature.

The sample No. 2 has almost the same specifications as that of No. 1 except that the degree of vacuum for forming the Si layers 42 is 5 to $8 \times 10^{-7}$ Torr. The sample No. 3 employs Ge instead of Si for layers 42. The condition for forming the lamination is the same as that of No. 1.

Figure 6:
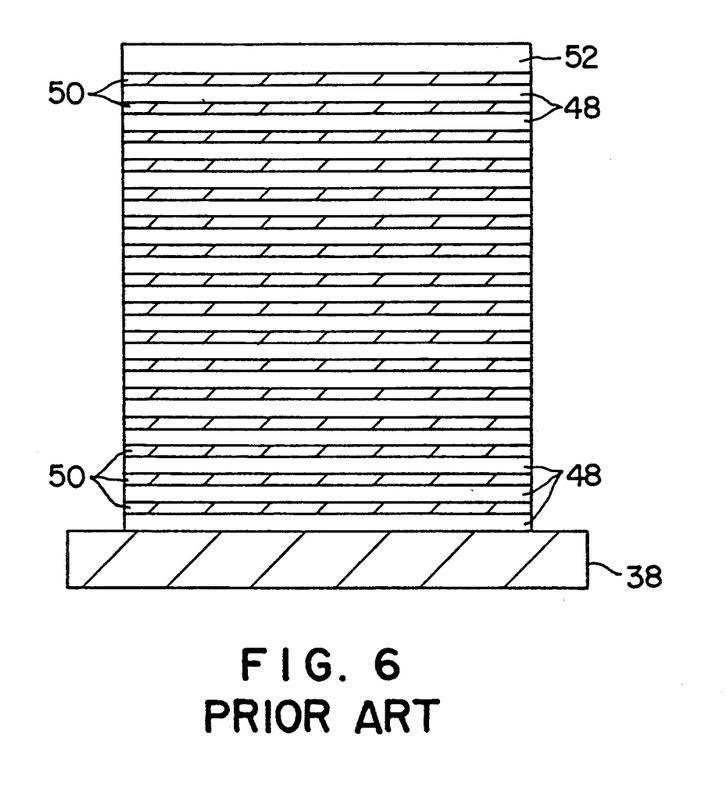
FIG. 6 is a side cross-sectional view of a conventional reflecting mirror.

The sample No. 4 is configured as shown in FIG. 6. First, eight layers of SiO$_2$ 48 and eight layers of TiO$_2$ 50, each layer having optical thickness of λ/4, are alternately laminated with each other to form a sixteen-layer lamination on a glass substrate 38 by ion beam-assisted evaporation. A SiO$_2$ layer 52 is further laminated on the top of the lamination with an optical thickness of λ/2. The conditions for forming the SiO$_2$ layers 48 are an 10 Å/sec evaporation rate and $3 \times 10^{-5}$ Torr degree of vacuum, and for the TiO$_2$ layers 50, 1 Å/sec and $3 \times 10^{-4}$ Torr, when the substrate 38 is at room temperature. The ion-assisted power for each layer is 500 V - 35 mA and the assisting gas is oxygen.

The sample No. 5 is composed by forming a single Si layer on a glass plate by vacuum evaporation. The conditions for forming the layers a are 3 Å/sec evaporation rate and 1 to $3 \times 10^{-6}$ Torr degree of vacuum, and for the TiO$_2$ layers 50, 1 Å/sec and $3 \times 10^{-4}$ Torr, when the temperature of a substrate is 200° C.

The improved mirror according to the present invention is further explained with reference to Table 1.

TABLE 1

| No. | Composition | Total thickness of lamination μm (substrate excluded) | Transmittance % | Reflectivity % |
|---|---|---|---|---|
| 1 | SiO/SiO$_2$ 11 layers | 0.87 | 0.006 | 84 |
| 2 | SiO/SiO$_2$ 11 layers | 0.86 | 0.003 | 79 |
| 3 | Ge/SiO$_2$ 11 layers | 0.85 | 0.005 | 82 |
| 4 | TiO$_2$/SiO$_2$ 17 layers | 1.37 | 0.15 | 99 |
| 5 | Si single layer | 6.2 | 0.003 | — |

Table 1 shows comparisons of the total thickness of the lamination including the top layer, the transmittance and the reflectivity of the samples Nos. 1 to 5. The transmittance and reflectivity are measured with light of 540 nm wavelength which is used for reading information. Nos. 1 to 3 have reflectivity in the range of 79 to 84%, slightly inferior to No. 4 which has 99%. Nos. 1 to 3 have transmittance in the range of 0.003 to 0.006%, in contrast to No. 4 of 0.15%. It is found that the improved mirrors of samples 1 to 3 have transmittance roughly 30 times less than that of the conventional type. Sample No. 2 is equivalent to Sample No. 5 in transmittance.

Regarding the thickness of the laminations, Nos. 2 and 5 have thickness of 0.86 and 6.2 μm, respectively. Consequently, No. 2 with a thickness of about 1/7 of that of No. 5 has a light blocking function equivalent to that of No. 5.

As is described, the improved reflecting mirror has a light absorbing layer of silicon or germanium in a dielectric mirror. Its reflectivity is slightly lower, causing a reading light RL to be absorbed, however, its transmittance of the light RL is extremely small, which noticeably improves its overall characteristics. The thickness of the lamination of the improved reflecting mirror for obtaining the required characteristics is less than that of the conventional type.

Another improved mirror according to the present invention will be explained with reference to FIGS. 7 and 8. Samples A and B shown in FIGS. 7 and 8 are another improved reflecting mirror and a conventional reflecting mirror, respectively.

Figure 7:
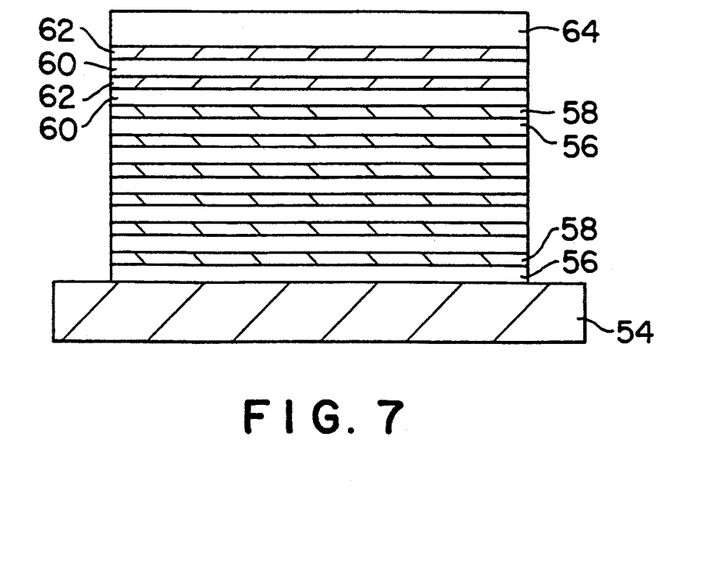
FIG. 7 is a side cross-sectional view of another improved reflecting mirror according to the present invention.

The sample A shown in FIG. 7 is composed as follows. First, six layers of $SiO_2$ 56 and six Si layers 58 each layer having an optical thickness of $\lambda/4$, are alternately laminated with each other to form a twelve-layer lamination on a glass substrate 54 under the same conditions as that of sample No. 2. Further, on top of the lamination, two layers of $SiO_2$ 60 and two layers of $TiO_2$ 62, each having an optical thickness of $\lambda/4$, are alternately laminated with each other to form a sixteen-layer lamination on the glass substrate 54. Further, a $SiO_2$ layer 64 is lastly laminated on the top of the sixteen-layer lamination with an optical thickness of $\lambda/2$. The total thickness of the lamination of the sample A is 1.3 $\mu m$ (the substrate 54 excluded).

Figure 8:
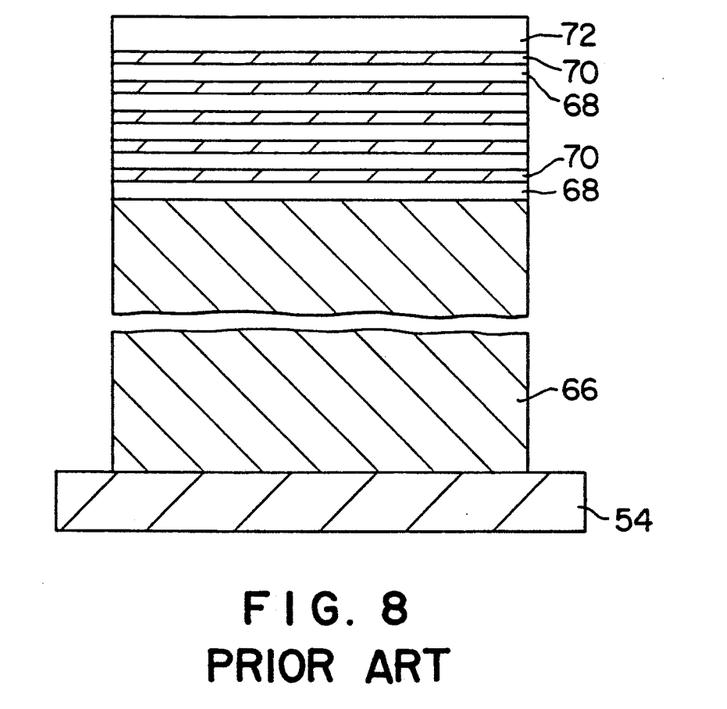
FIG. 8 is a side cross-sectional view of another conventional reflecting mirror.

The sample B shown in FIG. 8 is composed as follows. First, an Si layer 66 is laminated on a glass plate 54 under the same conditions as that of sample No. 5. Then, five layers of $SiO_2$ 68 and five layers of $TiO_2$ layers 70 each layer having optical thickness of $\lambda/4$, are alternately laminated with each other on top of the Si layer 66 under the same conditions as that of sample No. 4. A $SiO_2$ layer 72 of $\lambda/2$ optical thickness is lastly laminated on top of the lamination, resulting in a laminated structure having a total thickness of 7.9 $\mu m$ formed on the glass substrate 54.

The characteristics of the improved mirror are further explained with reference to FIGS. 9 and 10. Graphs L1 and L2 depicted in FIG. 9 show absorption factors of the samples A and B, while L3 and L4 in FIG. 10 show the reflectivities thereof, respectively.

Figure 9:
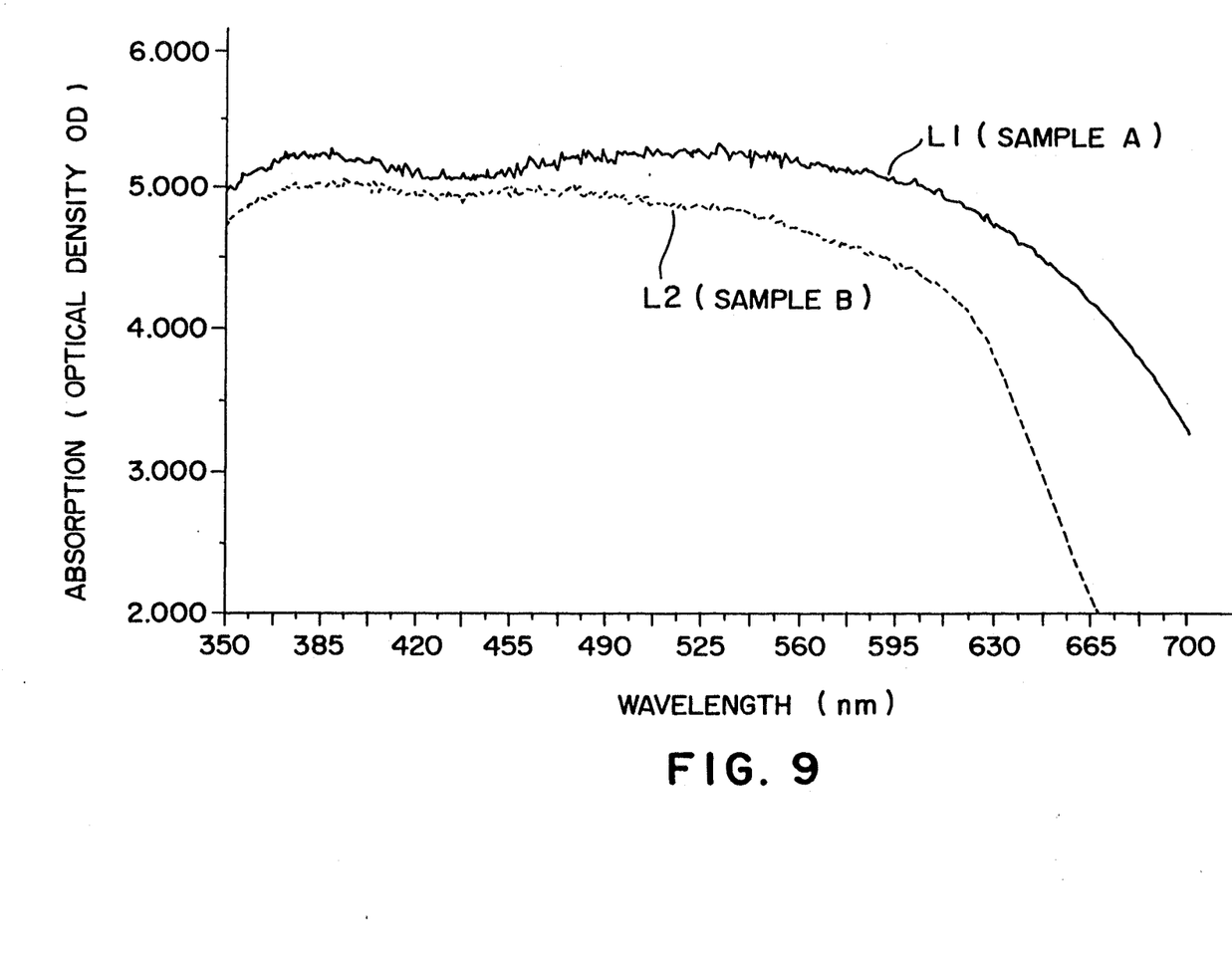
FIGS. 9 and 10 are graphs showing the characteristics of the reflecting mirror shown in FIG. 7 compared to the conventional shown in FIG. 8.

First, absorption factors of the samples A and B are compared to each other with reference to FIG. 9. FIG. 9 shows that sample A of the reflecting mirror has better absorption than that of sample B over the range of visible rays. The thickness of the lamination of sample A is about one-sixth that of sample B. This results in sample A having better light-blocking capability than sample B over the range of visible rays.

Figure 10:
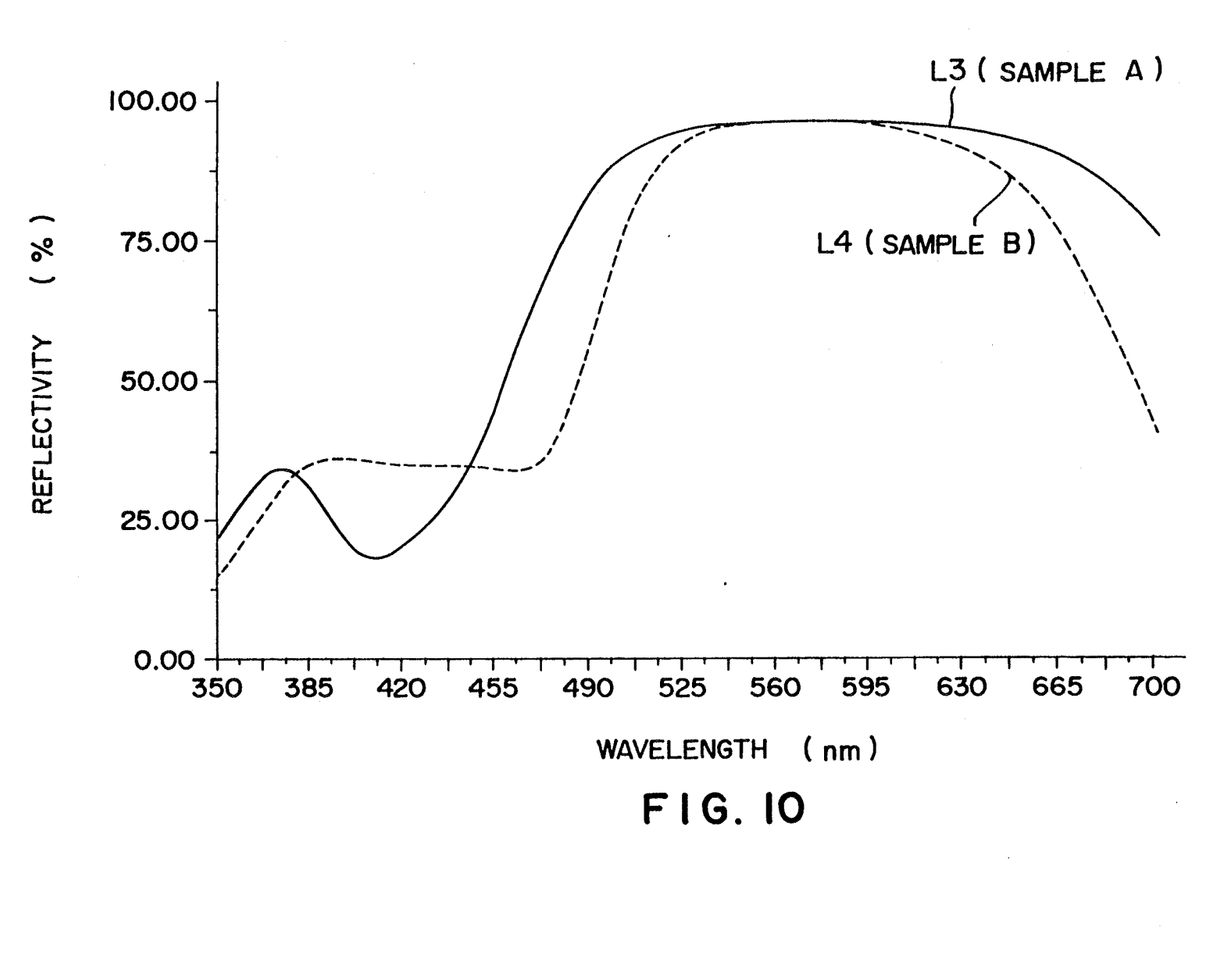

Next, the reflectivities of the samples A and B are compared to each other with reference to FIG. 10. FIG. 10 shows that the samples A and B have the same maximum reflectivity however, sample A has higher reflection capability than sample B over a wide range of wavelength.

With respect to the absorption and the reflectivity described above, it is found that sample A compared to sample B reflects better an incident light in a wide wavelength range and absorbs better a part of the light which is not reflected. Therefore, the light reflected by the sample A is higher in intensity and the light passing therethrough is lower in intensity in comparison.

The second preferred embodiment according to the present invention will be explained. A spatial light modulator in this embodiment is composed such that the sample No. 1 of the improved mirror is employed instead of the dielectric mirror 22 and the light blocking layer 20 shown in FIG. 4. An ITO layer is employed as each of the transparent electrodes 14 and 16, an amorphous-silicon layer formed by chemical vapor deposition forms the photoconductive layer 18 and the twisted-nematic liquid crystal forms the photo-modulation layer 24.

The resolution of the spatial light modulator measured 100 lp/mm, which is several times higher than that of the conventional element. Furthermore, there was no degradation in the contrast ratio of an image which was read out by an light with the intensity $10^4$ times that of a light carrying the image.

As is understood from the foregoing, the dielectric mirror acts as the reflection layer and the light blocking layer by providing therein a light absorbing material which absorbs light in the range of the wavelength to be used. Accordingly, the total thickness of the dielectric mirror and the light blocking layer in the preferred embodiments becomes remarkably thinner than that of a conventional element so that resolution of the image to be read out and its contrast ratio will be improved. Furthermore, the time required for forming a lamination is shortened so that productivity will be also improved.

While the embodiments of the present invention, as herein disclosed, constitute a preferred form, it is to be understood that other forms might be adopted. For instance, any number of layers may be laminated with each other to form a desired laminated structure. Also impurities, such as boron, carbon, nitrogen, oxygen, fluorine and phosphorus, may be included in the silicon or germanium layer. The quantity of oxygen included in each Si layer 42 of the sample Nos. 1 and 2 in the improved reflecting mirror is 2% and below the measurable limit respectively by Auger-spectral analysis.

Further, the light WL or RL may not necessarily be a visible light but it can be any electro-magnetic radiation beam which causes the desired effect in the targeted material.

What is claimed is:

1. A spatial light modulator comprising:
   a first electrode through which a first electro-magnetic radiation beam carrying information to be written into the modulator passes;
   a second electrode through which a second electro-magnetic radiation beam for reading the information written in the modulator passes;
   a photoconductive layer member whose impedance varying in response to an intensity of the first electro-magnetic radiation beam incident thereto;
   a photo-modulation layer member, comprising a composite layer of polymer and liquid crystal material dispersed in the polymer, modulating the second electro-magnetic radiation beam passing therethrough owing to an electro-optic effect of the photo-modulation layer member for reading the information written in the modulator; and
   reflecting means laminated to the photo-modulation layer member and comprising a light-absorbing layer including germanium for reflecting the second electro-magnetic radiation beam incident to and passing through the photo-modulation layer member;
   wherein the photoconductive layer member, the photo-modulation layer member, and the reflecting means are interposed between the first and second electrodes.

2. The modulator according to claim 1, wherein the polymer has volume resistivity of $10\text{-}\Omega\text{-cm}$ or more.

3. The modulator according to claim 1, wherein the liquid crystal is a material exhibiting liquid crystal phase at a room temperature, and has volume resistivity of $10^{13}\ \Omega\text{-cm}$ or more.

4. The modulator according to claim 1, wherein the reflecting means is a laminated structure comprising a plurality of layers of two characteristic groups, a refractive index being different from each other between the two groups, and the layer of at least one of the two groups being the light-absorbing layer.

* * * * *